United States Patent
Smith et al.

(10) Patent No.: US 8,051,771 B2
(45) Date of Patent: Nov. 8, 2011

(54) BELT ROUTING IN A ROUND BALER

(75) Inventors: Kevin M. Smith, Narvon, PA (US); John H. Merritt, New Holland, PA (US)

(73) Assignee: CNH America LLC, New Holland, PA (US)

( * ) Notice: Subject to any disclaimer, the term of this patent is extended or adjusted under 35 U.S.C. 154(b) by 198 days.

(21) Appl. No.: 12/494,650

(22) Filed: Jun. 30, 2009

(65) Prior Publication Data

US 2010/0326294 A1    Dec. 30, 2010

(51) Int. Cl.
*B30B 5/06* (2006.01)
*A01D 39/00* (2006.01)

(52) U.S. Cl. .......................................... 100/88; 56/341

(58) Field of Classification Search ............... 100/87, 100/88; 56/341
See application file for complete search history.

(56) References Cited

U.S. PATENT DOCUMENTS

| | | |
|---|---|---|
| 4,273,036 A | 6/1981 | Kopaska |
| 4,345,421 A | 8/1982 | Schwalenberg et al. |
| 4,391,187 A | 7/1983 | Koning et al. |
| 4,566,379 A | 1/1986 | Decoene et al. |
| 4,870,812 A | 10/1989 | Jennings et al. |
| 5,138,942 A | 8/1992 | Henderson et al. |
| 5,315,925 A | 5/1994 | Viaud et al. |
| 5,768,986 A | 6/1998 | Arnold et al. |
| 5,839,362 A | 11/1998 | Ratzlaff et al. |
| 6,079,324 A | 6/2000 | Feraboli et al. |
| 7,140,294 B1 | 11/2006 | Anstey et al. |
| 7,467,507 B2 * | 12/2008 | Viaud .............................. 56/341 |
| 7,703,391 B2 * | 4/2010 | Duenwald et al. ............... 100/35 |
| 2004/0031402 A1* | 2/2004 | Viaud .............................. 100/88 |
| 2005/0028688 A1* | 2/2005 | Derscheid ........................ 100/88 |
| 2007/0101874 A1 | 5/2007 | Viaud |

FOREIGN PATENT DOCUMENTS

| | | |
|---|---|---|
| EP | 0289092 B1 | 4/1993 |
| FR | 2793382 | 5/1999 |
| GB | 2246977 A | 2/1992 |

* cited by examiner

*Primary Examiner* — Jimmy T Nguyen
(74) *Attorney, Agent, or Firm* — Patrick M. Sheldrake; Michael G. Harms

(57) ABSTRACT

An improved mechanism for directing movement of a plurality of side-by-side belts in a round baler wherein a bale chamber is optimally configured for bale core formation thereby reducing the need for an aggressive surface on the belts to initiate rotation of the incoming crop material. As the bale expands, the improved mechanism enables the unguided span of belts surrounding the periphery of the bale to be minimized by positioning intermediate guide rolls generally equidistantly from idler rolls bounding the belt guides defining the bale forming chamber. Further, the improved mechanism reduces the friction force between the crop and the belts necessary to initiate crop rolling for bale core formation enabling smooth-surfaced belts to be used which reduce trash generation.

16 Claims, 4 Drawing Sheets

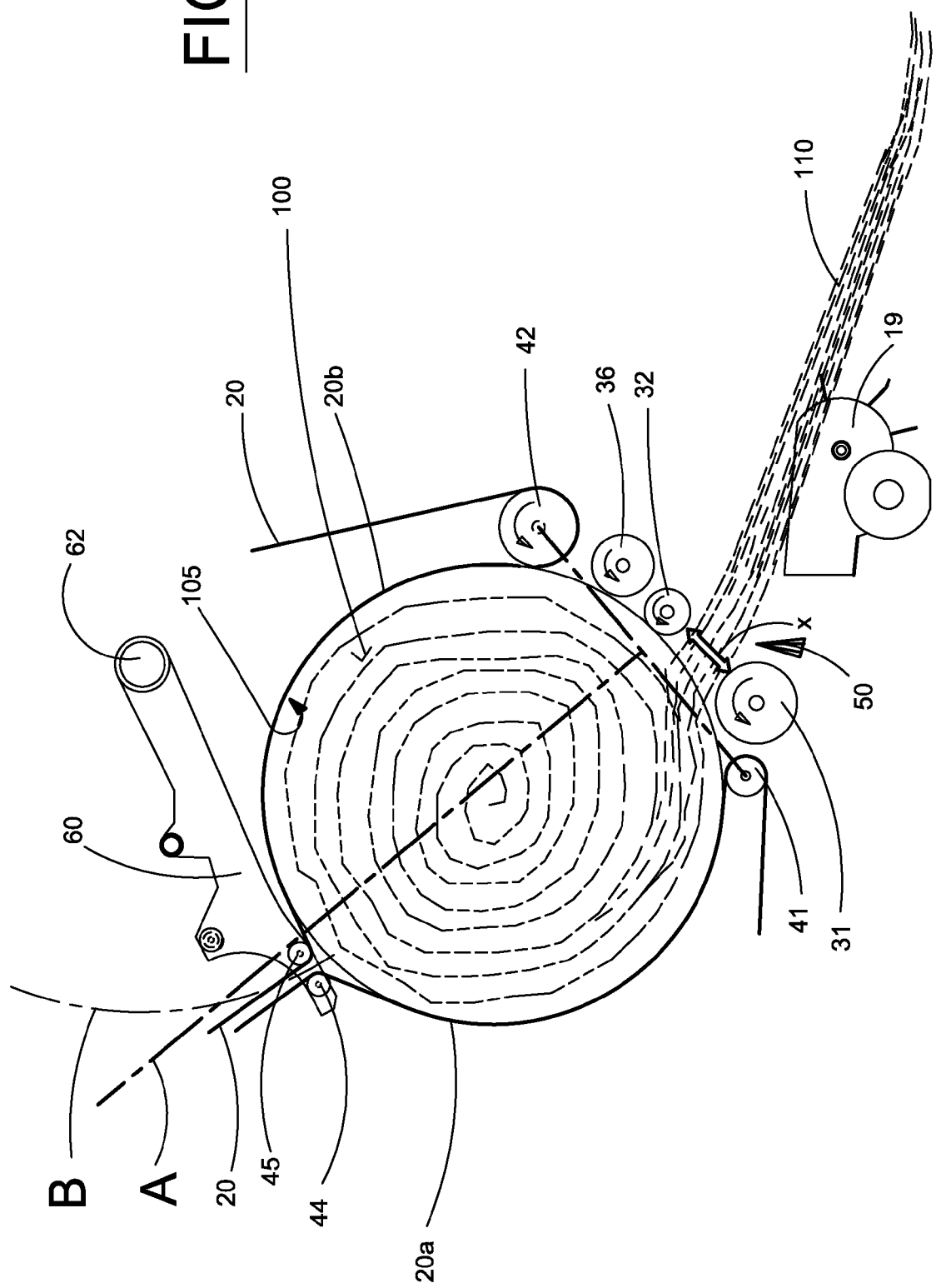

BELT ROUTING IN A ROUND BALER

BACKGROUND OF THE INVENTION

The present invention relates generally to agricultural balers and more particularly to round balers which form cylindrical bales using one or more movable belts and/or rollers disposed in a bale-forming chamber.

Round balers have become quite prevalent for their capability of producing a conveniently sized cylindrical bale, very often automatically wrapped with a sheeting material such as net or film. Prior art round balers generally have a bale-forming chamber defined by an apron comprising an array of side-by-side belts, transverse slats trained on chains, a plurality of rolls or a combination of these various elements, e.g., rolls and belts. Crop material, such as hay, is picked up from the ground as the baler travels across the field, and is fed into a fixed or expandable chamber where it is rolled up to form a compact cylindrical hay package. While still inside the bale-forming chamber in its compacted form, the outer surface of the package is wrapped with twine or other wrapping material, such as film or net, prior to ejection of the wrapped bale from the chamber onto the ground for subsequent handling.

U.S. Pat. Nos. 4,870,812 and 5,367,865 issued to Jennings et al., disclose prior art round balers having an expandable bale chamber defined by a pair of fixed sidewalls, and a plurality of side-by-side belts cooperating with a series of transverse rolls, mounted between a pair of pivotally mounted arms commonly known as a sledge. The chamber includes an inlet opening in the front through which crop material is fed. Also included is a pair of take up arms pivotally mounted on the main frame, between which arms a pair of guide rolls are journalled. A biasing force on the take up arms urges the outer surfaces of the guide rolls against the belts to maintain tension and thereby prevent slack from occurring in the belts during expansion and contraction of the chamber.

As the bale increases in size in the chamber, an increasing proportion of the belts spans between the two guide rolls and around the periphery of the bale. Proper belt tensioning is critical as the bale grows to maintain proper belt tracking and evenly apply tension across the bale width, a a complex task given that upwards of fifteen feet of belt length may be wrapped around the bale periphery between the two guide rolls. Furthermore, the shape of the portion of the bale chamber defined by the belts during the bale formation period is generally flat as a result of the belts spanning between two guide rolls. To overcome the limitations of this asymmetric bale chamber shape, movement of the belts and an aggressive belt surface are required to adequately urge the incoming crop material in the proper direction to begin rolling to form the bale. Aggressive belt surfaces which help promote initial bale core formation also tends to pull more crop material from the incoming crop mat resulting in increased wastage.

It would be desirable to provide a mechanism for guiding the roll belts in a round baler which reduces the unguided belts spans thereby improving belt tracking. Additional advantages would be realized in a mechanism for guiding the roll belts in a round baler that creates an optimum bale core forming configuration in the bale chamber to improve bale core formation. Still further advantages would be realized through an improved roll belt guide combined with an improved bale core forming configuration that enables rolling motion of the incoming crop material to be more easily initiated thereby reducing crop wastage and input power requirements.

SUMMARY OF THE INVENTION

Accordingly, the present invention, in any of the embodiments described herein, may provide one or more of the following advantages:

It is an object of the present invention to provide a roll belt guide mechanism in an agricultural round baler that improves control of the roll belt position and tension through the bale forming cycle.

It is a further object of the present invention to provide a roll belt guide mechanism that reduces the supported spans of guide belts throughout the bale forming cycle.

It is a further object of the present invention to provide a roll belt guide mechanism that enables the bale chamber during the core forming portion of the bale forming cycle to be optimally configured for core formation.

It is a further object of the present invention to provide a roll belt guide mechanism that positions a pair of guide rollers generally equidistantly between the lower and forward idler rolls through movement of the guide mechanism during a bale forming cycle to minimize the length of unsupported guide belt encircling the bale periphery during the bale formation cycle.

It is a still further object of the present invention to provide a guide mechanism for the roll belts in an agricultural round baler that produce an optimally shaped bale core formation chamber wherein the height of the core formation chamber is approximately three times the size of the crop infeed opening and the width of the core formation chamber is approximately two times the size of the crop infeed opening.

It is a still further object of the present invention to provide an optimally configured bale core formation chamber that enables smooth-surface roll guide belts to be used in lieu of aggressive belt surfaces commonly employed to assure proper bale core formation. Smooth surface belts reduce the amount of crop material pulled from the incoming crop mat thereby reducing trash build-up in the bale chamber.

It is a still further object of the present invention to provide an improved roll belt guide mechanism for an agricultural round baler that is durable in construction, inexpensive of manufacture, carefree of maintenance, easily assembled, and simple and effective to use.

These and other objects are achieved according to the instant invention by providing an improved mechanism for directing movement of a plurality of side-by-side belts in a round baler wherein a bale chamber is optimally configured for bale core formation thereby reducing the need for an aggressive surface on the belts to initiate rotation of the incoming crop material. As the bale expands, the improved mechanism enables the unguided span of belts surrounding the periphery of the bale to be minimized by positioning intermediate guide rolls generally equidistantly from idler rolls bounding the belt guides defining the bale forming chamber. Furthermore, the improved mechanism reduces the friction force between the crop and the belts necessary to initiate crop rolling for bale core formation enabling smooth-surfaced belts to be used which reduce trash generation.

BRIEF DESCRIPTION OF THE DRAWINGS

The advantages of this invention will be apparent upon consideration of the following detailed disclosure of the invention, especially when taken in conjunction with the accompanying drawings wherein:

FIG. 4 is a partial view of the bale forming chamber showing the chamber in the completed bale configuration.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Figure 1:
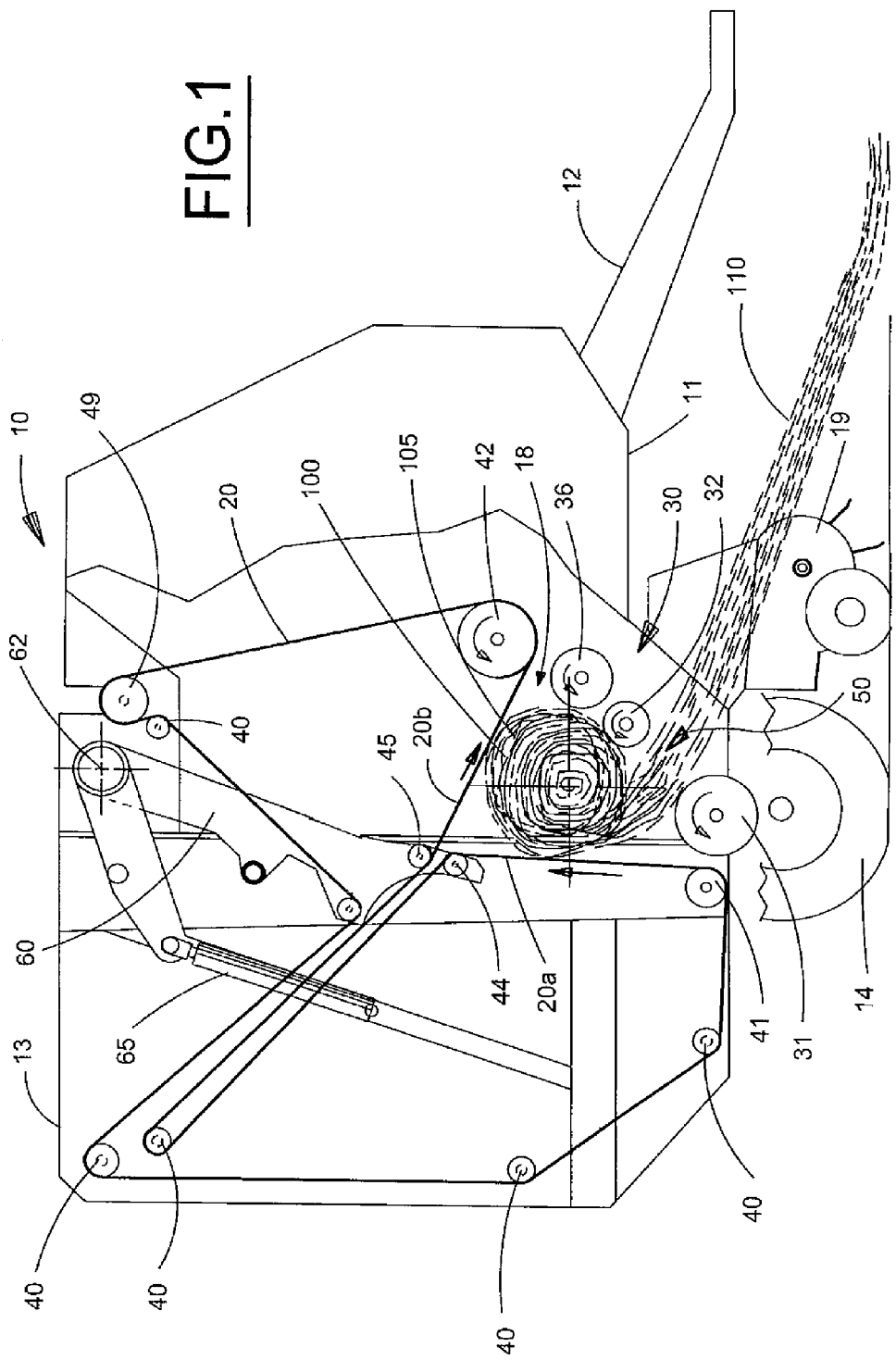
FIG. 1 is a side view of a typical agricultural round baler on which the present invention is useful showing a bale forming chamber configured at the beginning of a bale forming cycle.
Figure 2:
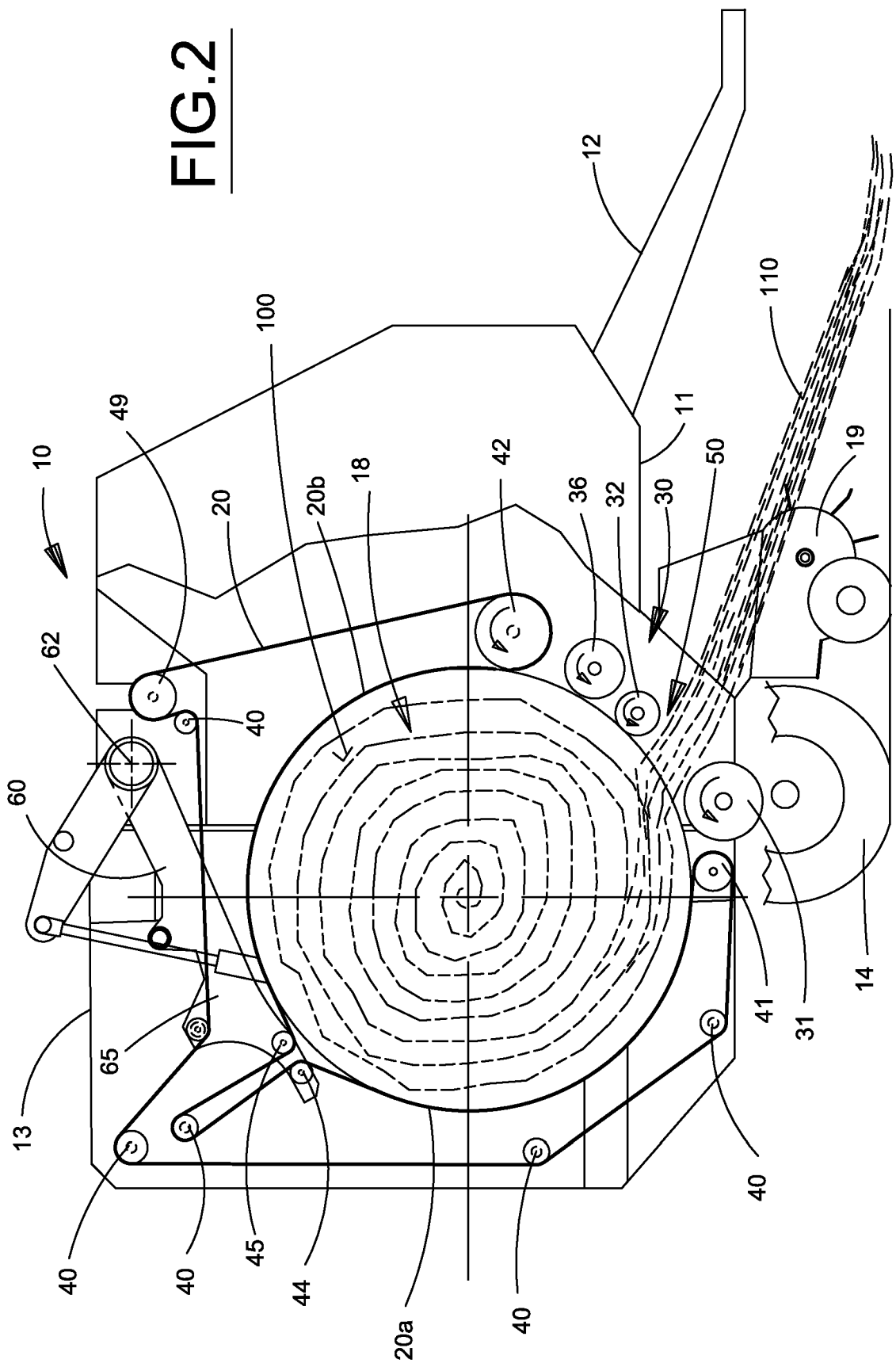
FIG. 2 is a side view of the agricultural round baler in FIG. 1 in which the bale forming chamber is configured as it would be near the end of a bale forming cycle.

Referring to FIGS. 1 and 2, a generally well-known round baler 10 is shown to comprise a main frame 11 terminating forwardly in a tongue 12 and rearwardly, slightly beyond a transverse axle to which a pair of wheels 14 (only one shown) are mounted, thus forming a wheel supported main frame. The main frame 11 supports a series of movable belts 20, transversely arranged fixed rolls 30, and belt guide rolls 40 which together with a pair of generally parallel and opposing sidewalls establish an expandable bale-forming chamber 18. Cut crop material 110 is picked up by transverse pickup 19 and fed into bale-forming chamber 18 where it is formed into a cylindrically shaped bale 100 by movement of the belts 20 and rolls 30. A completed bale 100, that is one that has reached a desired diameter as shown in FIG. 2, is then wrapped with twine or a wrapping material to maintain the bale shape after ejection from the baler. Upon completion of the wrapping process, the tailgate 13 pivots upwardly to open the rearward portion of the bale forming chamber 18 and the bale 100 is ejected onto the ground.

Fixed rolls 30 positioned in bale forming chamber 18 comprise at least a floor roll 31 and a starter roll 32 which are transversely aligned with respect to the main frame. Other fixed rolls (e.g., 36) may be used to further define the lower and forward portions of the bale chamber periphery. Fixed rolls 30 are driven in the direction shown by conventional means (i.e., chains and sprockets or gears) connected to and powered by a tractor power take-off (not shown). Floor roll 31 and starter roll 32 are spaced-apart to form a throat or crop infeed opening 50 through which crop material enters the bale-forming chamber. The rearward and upper portions of the bale forming chamber 18 are defined by movable belts 20 (shown as 20a and 20b, respectively, in the bale forming chamber), a plurality of side-by-side belts spanning the guide rolls 40 in a manner to create the expandable bale chamber 18. The belts are powered by drive roller 49 to move around the guide rollers 40 in a generally clockwise direction around the bale forming chamber as shown which, in conjunction with rotation of the fixed rolls 30, causes the incoming crop material to be coiled in a generally clockwise direction to form the bale.

Some of the belt guide rollers 40 are positioned on a belt tension arm 60, specifically a first guide roller 44 and a second guide roller 45, where they manage movement of the belts 20 as the bale forming in the chamber expands. First and second guide rollers 44, 45, are positioned closely adjacent to each other, separated by a space sufficient for passage of the belts and to prevent contact between the portions of the belts moving in opposite directions through the space. The positioning of guide rollers 44, 45 is such that a first portion of the belts 20a spans unsupported between lower idler roller 41 and first guide roller 44 and a second portion of the belts 20b spans between second guide roller 45 and forward idler roller 42. When the bale chamber is empty or a bale core is being initially formed, the belts will follow a generally straight path between the rollers defining a chamber having a generally vertical portion of the belts rearwardly in the chamber and a generally horizontal portion of the belts upwardly in the chamber. This creates a core formation chamber with rearward and topward boundaries that are generally right-angled relative to each other. As the bale grows, the belts will follow the perimeter contour of the bale in the chamber and the angle between the rearward and topward portions will increase to a near-tangential relationship when the bale is fully formed.

Belt tension arm 60 is pivotally connected to frame 11 at a pivot point 62 positioned generally above the bale forming chamber and slightly forward of the bale roll centerline. Tension arm 60 is pivotable between generally first and second positions and is moved by actuator 65 between those positions to maintain proper belt tension against the expanding crop roll. Belt take-up and tensioning apparatus of this type are well known in the art and not further discussed in detail herein. Exemplar take-up apparatus are described in U.S. Pat. Nos. 4,870,812 and 5,367,865, both to Jennings et al., each being incorporated herein by reference. The first position corresponds to that shown in FIG. 1 in which a bale is beginning to be formed. This first position is also referred to as the bale core formation position. The second position, shown in FIG. 2 corresponds to a bale that has reached a desired size and is ready to be ejected from the baler.

Figure 3:
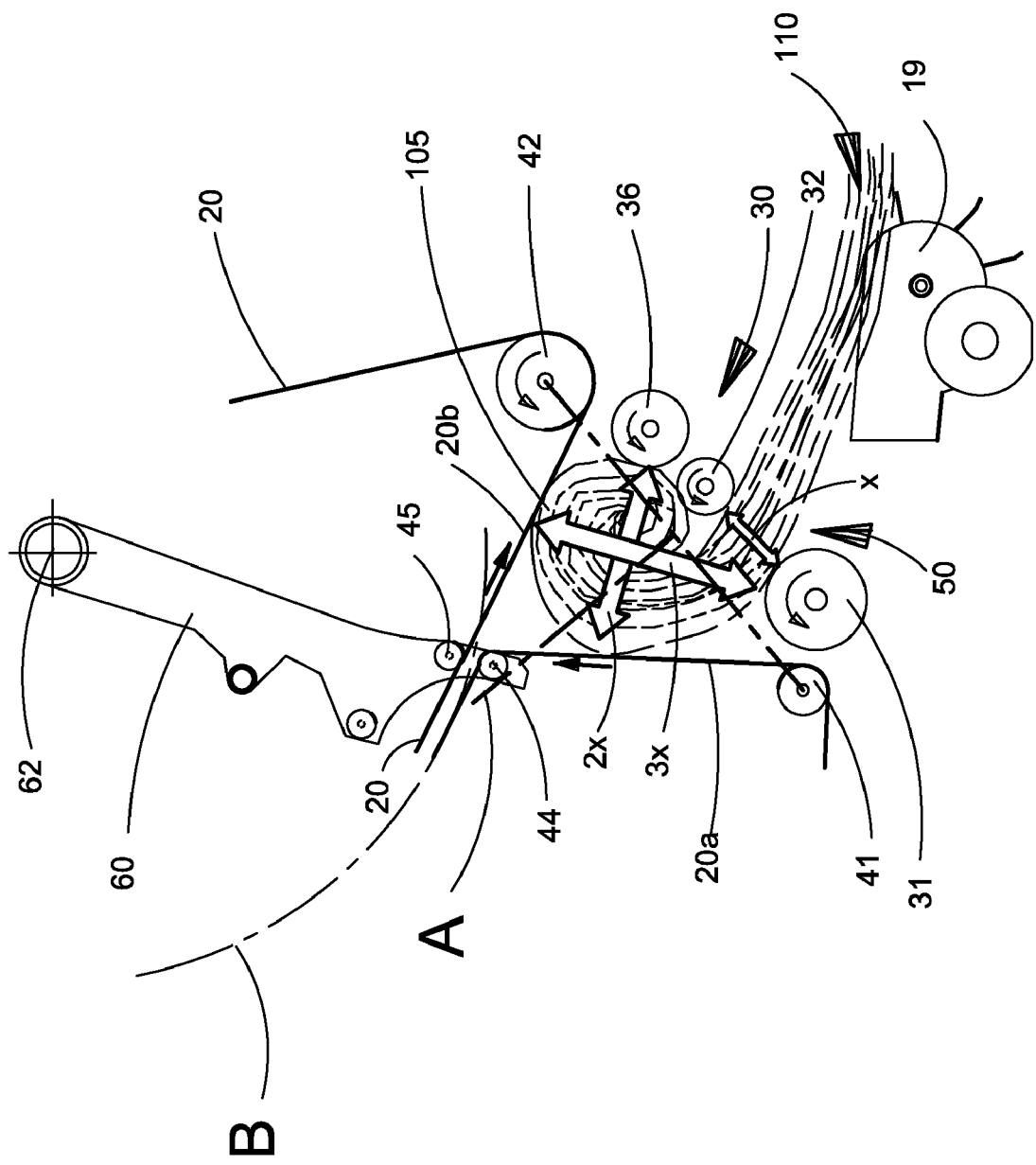
FIG. 3 is a partial view of the bale forming chamber showing the chamber in the bale core initiation configuration.

Now referring to FIG. 3 in conjunction with FIG. 1, the bale forming chamber 18 is shown in the initial bale core formation position. In contrast to many round balers in which incoming crop material impinges on a single span of the belts which requires an abrupt turn of the incoming mat of crop material 110, the core formation configuration of the bale chamber 18 embodying the present invention includes first portion 20a of the belts and second portion 20b. First and second portions 20a, 20b, respectively, are angled with respect to each other to define the rearward and upper surface of the bale core formation chamber. First portion 20a is acutely angled relative to the path of the incoming crop material mat 110 to commence the coiling of the crop mat. As the crop mat 110 begins to curve upon contact with first portion 20a, second portion 20b is encountered which continues forcing the crop mat 110 to coil to form the bale core. The curvilinear path of the incoming crop mat 110 next comes in contact with the fixed rolls 30 which continue to urge the crop mat along a curved path. The crop mat 110 then contacts itself to complete the coil with the incoming crop mat being coiled on the outside perimeter of the forming bale.

Movement of the initial coil of incoming crop material is critical for bale core formation. To this end, the present invention includes a specifically configured bale chamber during the bale core formation period. The incoming crop mat has a thickness dimension which is established by the size of infeed opening 50, shown as dimension "X" in FIG. 3. In order to promote the initial coiling of the crop mat in the bale chamber, the depth of the bale chamber in the forward-rearward direction is approximately two times the mat thickness dimension; the height of the bale chamber during this period is approximately three times the mat thickness dimension. This geometry allows the initial crop mat to fold onto itself and form the core of the bale without the need to aggressively force the incoming crop to rotate. By optimizing the core formation chamber geometry, the need for an aggressive surface on the belt surfaces is eliminated. The use of smooth-surface belts is much gentler on the crop material and does not pull as much crop material from the infeeding crop mat, thereby reducing trash generation within the baler.

Finally, referring to FIGS. 3 and 4, the improvements in the belt tensioning arrangement are shown in greater detail. The length of the belt tensioning arm 60 and the location of pivot axis 62 are critical to provide proper belt tracking within the bale chamber. The pivot axis 62 is transversely positioned above the bale forming chamber, even when the chamber is in the full bale configuration. During the core formation portion of the bale cycle, the bale roll center is generally below the pivot point 62. As the bale increases in size, the bale roll center moves rearwardly and upwardly, generally toward the guide rollers 44, 45. By positioning the guide rollers 44, 45 generally equidistantly around the bale circumference, the maximum unrestrained length (that is the belt length around the bale perimeter between the lower and forward idler rolls 41, 42) of the belts surrounding the bale is minimized thereby improving belt tracking. In the embodiment shown, first guide roller 44 and a second guide roller 45 are positioned on tensioning arm such that they remain generally equidistant around the bale perimeter 105 from the lower and forward idler rolls, 41, 42, respectively, as the bale size increases in the chamber. By re-positioning the pivot axis of the tensioning arm above the bale forming chamber instead of forward of the chamber, and by utilizing a tension arm radius that is greater than the maximum bale radius, the guide rollers 44, 45, will remain generally opposite of the infeed opening 50 as the tensioning arm 60 sweeps through an arc while moving between its terminal positions. This is best illustrated by comparing the relative positions of a line perpendicularly bisecting the centers of the lower and forward idler rolls, 41, 42, shown as "A" in FIGS. 3 and 4, and the arc along with the first and second guide rollers 44, 45 travel as the tensioning arm moves between its first and second positions, shown as "B" in the figures. In each instance, the guide rollers 44, 45 are positioned close to the perpendicular bisecting line "A" indicating that unsupported spans of belt surround the bale, 20a and 20b, respectively, are generally equal in length.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. An agricultural round baler comprising:
   a ground-supported main frame;
   a bale forming chamber defined in a space between opposing side walls by a plurality of side-by-side belts trained around a plurality of elongate guide rolls extending transverse to said frame, said chamber further defined by a floor roll and a starter roll, each extending transverse to said main frame and spaced apart to form a crop infeed opening therebetween having an infeed dimension, said plurality of guide rolls including a forward idler roll and a lower idler roll, said lower and said forward idler rolls being positioned peripherally outboard of said floor roll and said starter roll, respectively, relative to said infeed opening, said bale forming chamber configured to form a cylindrically shaped bale oriented transverse to said frame by motion of said plurality of belts and rotation of said starter and floor rolls;
   a tension arm pivotally connected at a first end to said frame and configured for movement about an axis between opposing core formation and full bale positions, said pivot axis of the tension arm is transversely aligned generally above said bale forming chamber in both of said core formation and full bale positions, and said pivot axis is rearward of an axis of rotation of said starter roll and forward of an axis of rotation of said lower idler roll;
   first and second tension rolls connected to said tension arm at a second end opposite from said first end, said first and second tension rolls being aligned parallel to each other, transverse to said frame, and spaced apart to enable said plurality of belts to pass therebetween; and
   a first portion of said plurality of belts spanning directly between said lower idler roll and said first tension roll; and
   a second portion of said plurality of belts spanning directly between said forward idler roll and said second tension roll wherein said first and second portions, the floor roll and the starter roll generally define the periphery of the bale chamber, and said first portion is displaced from the starter roll approximately twice said infeed dimension forming the width of the chamber and said second portion is displaced from the floor roll approximately three time the infeed dimension when said tension arm is in the core formation position forming the height of the chamber, wherein the height and width are measured perpendicular to each other.

2. The baler of claim 1, wherein in the core formation the first and second portion are positioned to form a cavity vertically above the infeed opening having an approximate height and width of twice the infeed dimension said.

3. The baler of claim 2, wherein said first and second tension rolls are positioned generally peripherally opposite of said infeed opening and generally equidistantly spaced from said lower idler roll and said forward idler roll as said tension arm moves between said core formation and said full bale positions thereby minimizing the unguided span lengths of said first and second portions.

4. The baler of claim 1, further comprising an actuator configured to pivot said tension arm between said core formation and said full bale positions, wherein the tension rolls travel along an arc close to a perpendicular bisecting line between the centers of the lower and forward idler rolls.

5. The baler of claim 2, wherein the tension arm axis is rearward of the starter roll and above the lower idler roll.

6. An improved belt tensioning apparatus for an agricultural round baler, the baler having a ground-supported main frame, an expandable bale forming chamber defined in a space between opposing side walls by a plurality of side-by-side belts trained around a plurality of elongate guide rolls extending transverse to the frame, the chamber further defined by a floor roll and a starter roll, each extending transverse to the main frame and spaced apart to form a crop infeed opening therebetween having an infeed height dimension, the plurality of guide rolls including a forward idler roll and a lower idler roll, the lower and forward idler rolls being positioned peripherally outboard of the floor roll and the starter roll, respectively, relative to the infeed opening, the bale forming chamber configured to form a cylindrically shaped bale oriented transverse to said frame, the bale forming chamber expandingly configurable between a core formation position and a full bale position, the belt tensioning apparatus comprising:
- a tension arm pivotally connected at a first end to the frame and configured for movement about an axis between opposing core formation and full bale positions;
- first and second tension rolls connected to said tension arm at a second end opposite from said first end, said first and second tension rolls being aligned parallel to each other, transverse to the frame, and spaced apart to enable the plurality of belts to pass therebetween;
- a first portion of the plurality of belts spanning directly between the lower idler roll and said first tension roll; and
- a second portion of said plurality of belts spanning directly between the forward idler roll and said second tension roll;
- wherein said first and second tension rolls are disposed generally opposite of the infeed opening and generally equidistantly spaced from the lower idler roll and the forward idler roll as said tension arm moves between said core formation and said full bale positions thereby minimizing the unguided span lengths of said first and second portions, wherein the second end of the tension arm is located rearward of the lower idler roll when in a full bale position with respect to a forward direction of travel of the baler and the length between tension arm pivot axis and the closest tension roll is greater than a maximum possible bale radius when in a full bale position, and wherein said pivot axis of the tension arm is transversely aligned generally above said bale forming chamber in both of said core formation and full bale positions, and said pivot axis is rearward of an axis of rotation of said starter roll and forward of an axis of rotation of said lower idler roll.

7. The tensioning apparatus of claim 6, wherein in a core formation position the bale roll center is generally directly below the tension arm pivot axis.

8. The tensioning apparatus of claim 7, wherein the bale chamber has a height established between the floor roll and said second portion and a depth established between the starter roll and said and first portion, and said bale chamber height is approximately three times the infeed height dimension and said bale chamber depth is approximately two times the infeed height dimension when said tension arm is in the core formation position wherein the depth and width are measured generally perpendicular to each other.

9. The tensioning apparatus of claim 8, further comprising an actuator configured to pivot said tension arm between said core formation and said full bale positions, wherein the tension rolls travel along an arc close to a perpendicular bisecting line between the centers of the lower and forward idler rolls.

10. The tensioning apparatus of claim 9, wherein said plurality of belts further comprise a working surface for interacting with crop material and said working surface is generally smooth.

11. In an agricultural round baler having a ground-supported main frame, and a bale forming chamber defined by a pair of opposing and spaced-apart side walls, a floor roll and a starter roll each connected to and supported by the main frame in a parallel, spaced-apart orientation creating a crop infeed opening therebetween having an infeed dimension, a lower idler roll, a forward idler roll, a plurality of guide rolls, and a plurality of side-by-side belts trained around the plurality of guide rolls and the idler rolls, the improvement in a belt tensioning apparatus comprising:
- a tension arm pivotally connected at a first end to the main frame and configured for movement about an axis between opposing core formation and full bale positions, said pivot axis of the tension arm is transversely aligned generally above said bale forming chamber in both of said core formation and full bale positions, and said pivot axis is rearward of an axis of rotation of said starter roll and forward of an axis of rotation of said lower idler roll;
- first and second tension rolls connected to said tension arm at a second end opposite from said first end, said first and second tension rolls being aligned parallel to each other, transverse to said frame, and spaced apart to enable said plurality of belts to pass therebetween;
- a first portion of said plurality of belts spanning directly between the lower idler roll and said first tension roll; and
- a second portion of said plurality of belts spanning directly between the forward idler roll and said second tension roll wherein said first and second portions, the floor roll and the starter roll generally define the periphery of the bale chamber, and said first portion is displaced from the starter roll approximately twice said infeed dimension with and said second portion is displaced from the floor roll approximately three time the infeed dimension and the first and second portion form a cavity vertically above the infeed opening having an approximate height and width of twice the infeed dimension when said tension arm is in the core formation position.

12. The improvement of claim 11, wherein said first portion and said second portion are angled at generally a right angle with respect to one another when said tension arm is in said core formation position.

13. The improvement of claim 11, further comprising an actuator configured to pivot said tension arm between said core formation and said full bale positions, wherein the tension rolls travel along an arc close to a perpendicular bisecting line between the centers of the lower and forward idler rolls.

14. The improvement of claim 13, wherein said first and second tension rolls are positioned generally peripherally opposite of the infeed opening and generally equidistantly spaced from the lower idler roll and the forward idler roll as said tension arm moves between said core formation and said full bale positions.

15. The improvement of claim 14, wherein the plurality of belts further comprises a working surface for interacting with crop material and said working surface is generally smooth.

16. The improvement of claim 14, wherein the plurality of belts further comprises a working surface for interacting with crop material and said working surface does not include an aggressive surface profile for engaging the crop material.

* * * * *